May 19, 1936.   F. C. FRANK   2,041,462
BRAKE
Filed Oct. 21, 1932

INVENTOR.
Frederick C. Frank
BY Jerome R. Cox
ATTORNEY

Patented May 19, 1936

2,041,462

UNITED STATES PATENT OFFICE 2,041,462

BRAKE

Frederick C. Frank, South Bend, Ind., assignor to Bendix Aviation Corporation, South Bend, Ind., a corporation of Delaware Application October 21, 1932, Serial No. 638,968

7 Claims. (Cl. 188—152)

This application relates to brake apparatus, and more especially to an arrangement of brakes in an airplane wheel involving the use of two substantially semi-circular brake shoes and a pair of hydraulically actuated cylinders interposed between the brake shoes.

In the design of brakes, and especially in the design of brakes for airplanes it is desirable that a plurality of shoes be operated by a plurality of applying means, each of the applying means acting upon an appropriate end of the shoe so that while the shoe itself is self-energizing, the limitation of the length of the shoe resulting from the use of a plurality of shoes being sufficient to insure that the shoes will not be self locking. In such designs, it is desirable that the anchors for the shoes be easily adjustable, not so much in order that clearances may be adjustable to compensate for lining wear, but more in order that there may be provided a convenient method for compensating for manufacturing errors.

One of the objects of my invention is the provision of simple and efficient means for adjusting the anchors for brake shoes.

A further object of the invention is the provision in brakes of means coacting with the anchor for the brake shoe for positioning the shoe laterally within the drum.

Features of the invention are brake shoes having ball shaped end portions; sockets having spherical outlines adapted to receive the ball shaped ends of the brake shoes; a hydraulic actuating cylinder arranged to receive such sockets; and a steady rest or positioning pin coacting with the socket for positioning the brake shoes laterally of the drum.

Figure 1:
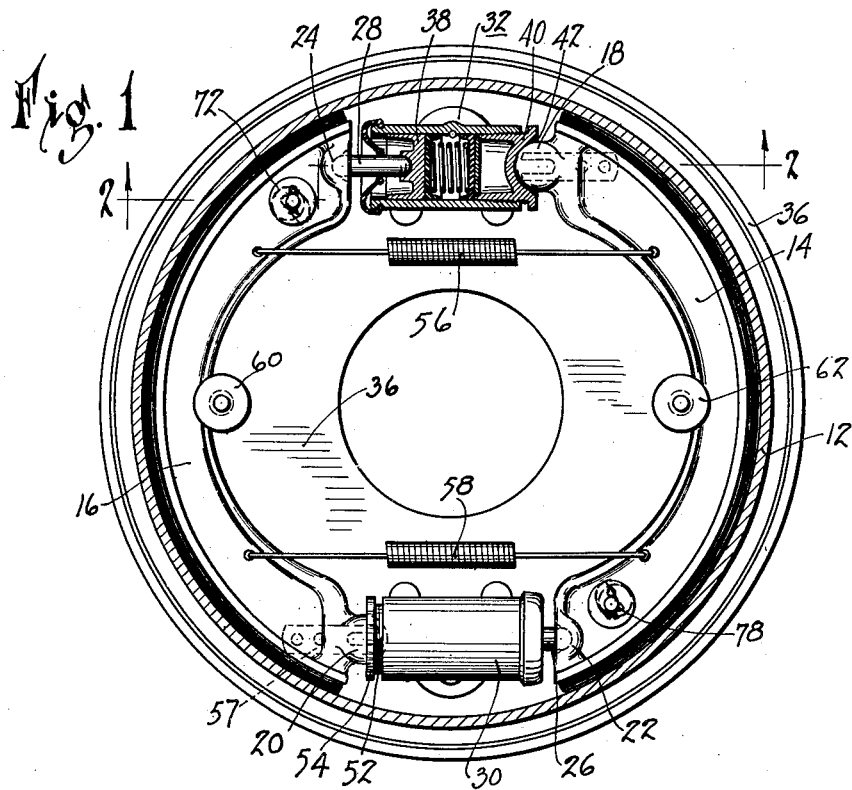
Figure 2:
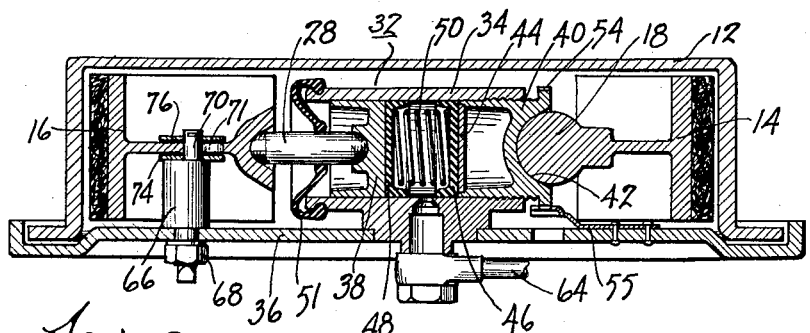

Further features and objects of the invention will be apparent after a reading of the subjoined specification and claims and after a consideration of the accompanying drawing in which:

Figure 1 is a view in vertical section of a brake constructed according to my invention; and Figure 2 is a view in horizontal section, taken substantially on the line 2—2 of Figure 1.

Referring particularly to the drawing, it may be seen that I have shown a wheel brake provided with a brake drum 12 within which there are positioned brake shoes 14 and 16. The webs of the shoes 14 and 16 are each formed at one end with ball shaped elements 18 and 20. At the ends of the shoes 14 and 16 opposite to the elements 18 and 20 there are sockets 22 and 24 provided for the reception of piston rods or pins 26 and 28. The shoes 14 and 16 are adapted to be moved into contact with the drum 12 by hydraulic means, said means including the pins 26 and 28 and fluid motors 30 and 32. Inasmuch as these fluid motors are exactly alike, it is believed that a detailed description of the motor 32 will be sufficient for both.

The motor 32 comprises an open ended cylindrical member or cylinder 34 secured to the backing plate 36 and provided with a piston 38. The piston 38 bears upon the inner end of the piston pin 28. The end of the cylindrical member 34 opposite to the piston pin 28 is formed with an internal thread. Into said threaded end of the cylinder there is screwed an externally threaded plug 40 formed with a spherical socket 42 into which the ball 18 is adapted to fit. The hollow inner end of the plug 40 is provided with a circular plate 44 and contacting with the plate 44 is a circular cup 46. Positioned substantially opposite to the cup 46 and facing the opposite direction is a similar circular cup 48 which cooperates with the piston 38. Interposed between the cups 46 and 48 is a compression spring 50 which maintains the cups in operating relationship with the plate 44 and with the piston 38 respectively. The cylinder 34 is provided with an annular dust cap 51 which surrounds the piston pin 28. As may be seen in the lower part of Figure 1, the cylinder 30 is, of course also provided with a plug 52 which is in all respects similar to the plug 40. As may be seen, the plugs are formed with knurled surfaces such as 54. By means thereof, the anchor formed by the plug may be adjusted. The adjustments are retained by means of spring clips 55 and 57 cooperating with the knurled surfaces of the anchor plugs.

Springs 56 and 58 are provided for returning the shoes 14 and 16 to their released position when pressure on the fluid supplied to the cylinders 30 and 32 is relieved. Brackets 60 and 62 are provided for lateral confinement of the shoes at approximately their mid-points. Fluid hoses such as 64 are provided for supplying fluid under pressure to the cylinders.

For determining the released position of the shoes and correcting for lining wear, eccentric adjustments 72 and 78 are provided. Stop 72 consists of a shaft 66 clamped to the backing plate by means of a nut 68. An eccentric extension or pin 70 of the shaft 66 fits in a D-shaped slot 71 formed in the web of the brake shoe. The eccentric pin 70 has secured thereto a pair of washers 74 and 76 by means of which the lateral position of the applying end of the brake shoe 16 is maintained. The similar eccentric adjustment 78 is provided for the shoe 14.

It is believed that the operation of the structure shown and described above will be clear from the description. The application of pressure to the hydraulic fluid causes the piston 38 to move outward and to force the pin 28 and the shoe 16 outward until the latter comes into contact with the drum. The shoe 16 anchors through the ball 20 and the corresponding socket in the plug 52, the latter transmitting the braking torque to the cylinder 30 and to the backing plate 36. Similarly, the piston in the cylinder 30 applies the shoe 14 and the brake torque thereof is transmitted through ball 18, the plug 40, and the cylinder 32 to the backing plate 36. Relief of pressure allows the springs 56 and 58 to withdraw the shoes from the drum. By rotation of the plugs 40 and 54, the anchor may be adjusted exactly as desired in the initial assembly of the brake. Thereafter, the return position of the shoes may be controlled by adjustment of the eccentrics 72 and 78. The stops 72 and 78 also function to prevent involuntary application of the shoes in the event of a break or loss of tension in the springs 56 and 58. Should this occur it can readily be seen that, for example, the shoe 16 upon the loss of the action of spring 58 and the shoe 14 upon the loss of the action of the spring 56, would (except for the stops 72 and 78) be pivoted clockwise about the brackets 60 and 62 into drum engagement. Particularly disastrous results would occur upon clockwise rotation of the drum as the ball 20 would be withdrawn from its socket and the full servo action of the shoe would be expended to destroy the rubber cup 51, the piston cups 46 and 48 and the end of cylinder 34. It is to be understood that the stops 72 and 78 do not interfere with the counterclockwise pivoting of the shoes 14 and 16 in normal brake application. The lateral position of the shoes is maintained by the eccentrics 72 and 78 and by the position of the balls 18 and 20 in the sockets of the plugs 40 and 54. The universal joints formed by the balls 18 and 20 at the sockets of the plugs 40 and 54 facilitate the pivoting of the shoes in brake application and release, makes the assembly and disassembly of the brakes relatively easy and allows the anchor to be positioned as desired by a very simple operation.

It is to be understood that the above described embodiments of the invention are for the purpose of illustration only, and various changes may be made therein without departing from the spirit and scope of the invention.

I claim:

1. In brake apparatus, a brake drum, a backing plate, a friction element in said drum, a hydraulic cylinder secured to said backing plate, a piston in said cylinder connected with one end of said friction element, a plug in the opposite end of said cylinder formed with a spherical socket, a second friction element, and a ball shaped end formed on the end of said last named friction element and fitting in said socket.

2. In brake apparatus a brake drum, a backing plate, a friction element in said drum, a hydraulic cylinder secured to said backing plate, a piston in said cylinder connected with one end of said friction element, and an anchor for said element comprising a second hydraulic cylinder secured to said backing plate and a threaded plug secured in one end of said last named cylinder formed with a spherical socket adapted to be screwed in and out of said cylinder for adjusting said anchor and a ball shaped end formed on the opposite end of said friction element and fitting in said socket.

3. In brake apparatus, a brake drum, a pair of brake shoes mounted in said drum, a backing plate, a pair of hydraulic actuating cylinders secured to said backing plate each for acting on one end of one of said shoes to move it into contact with said drum, and an adjustable anchor comprising a threaded plug secured in an end of each of said cylinders each for taking the braking torque from the shoe operated by the other cylinder.

4. In brake apparatus, a brake drum, a pair of brake shoes mounted in said drum, a backing plate, a pair of hydraulic actuating cylinders secured to said backing plate each for acting on one end of one of said shoes to move it into contact with said drum, a piston in each said cylinder connected with the other ends of said shoes, a plug in the opposite end of each said cylinder formed with a spherical socket, and a ball shaped end on the opposite end of each said shoe fitting in said socket.

5. In brake apparatus, a brake drum, a pair of brake shoes mounted in said drum, a backing plate, a pair of hydraulic actuating cylinders secured to said backing plate each for acting on one end of one of said shoes to move it into contact with said drum, a piston in each said cylinder connected with the other ends of said shoes, an adjustable threaded plug in the opposite end of each said cylinder formed with a spherical socket, and adapted to be screwed in and out of said cylinder, and a ball shaped end on the opposite end of each said shoe fitting in said socket.

6. In a brake apparatus, a brake drum, a backing plate, a pair of friction elements each havinging a ball shaped end and both positioned in said drum, a hydraulic cylinder arranged for moving one of said friction elements into contact with said drum and secured to said backing plate, and an adjustable anchor comprising a threaded plug threaded into one end of said hydraulic cylinder and formed with a spherical socket to which the ball shaped end of one of the friction elements extends.

7. In brake apparatus, a brake drum, a backing plate, a friction element having a ball shaped end and positioned in said drum, a pair of hydraulic cylinders, one of which is arranged to move said friction element into contact with said drum and both of which are secured to said backing plate, and an adjustable anchor comprising a threaded plug threaded into one end of one of said hydraulic cylinders and formed with a spherical socket to which the ball shaped end of the friction element extends.

FREDERICK C. FRANK.